US012370891B2

(12) United States Patent
Ando

(10) Patent No.: US 12,370,891 B2
(45) Date of Patent: Jul. 29, 2025

(54) VEHICLE

(71) Applicant: SUBARU CORPORATION, Tokyo (JP)

(72) Inventor: Yusuke Ando, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 190 days.

(21) Appl. No.: 18/140,039

(22) Filed: Apr. 27, 2023

(65) Prior Publication Data

US 2024/0051389 A1 Feb. 15, 2024

(30) Foreign Application Priority Data

May 11, 2022 (JP) .................................. 2022-078059

(51) Int. Cl.
*B60K 28/00* (2006.01)
*B60K 20/06* (2006.01)
*B60K 28/02* (2006.01)

(52) U.S. Cl.
CPC .............. *B60K 28/02* (2013.01); *B60K 20/06* (2013.01)

(58) Field of Classification Search
None
See application file for complete search history.

(56) References Cited

U.S. PATENT DOCUMENTS

| 2014/0039774 | A1* | 2/2014 | Kodama | B60W 50/0225 |
| | | | | 701/99 |
| 2014/0116179 | A1* | 5/2014 | Sata | F16H 59/02 |
| | | | | 74/473.31 |
| 2014/0121913 | A1* | 5/2014 | Sata | B60K 20/06 |
| | | | | 701/52 |
| 2017/0327120 | A1* | 11/2017 | Oh | B60W 50/082 |
| 2020/0216072 | A1* | 7/2020 | Noguchi | B60W 30/02 |

FOREIGN PATENT DOCUMENTS

JP 2021-172245 A 11/2021

* cited by examiner

*Primary Examiner* — Truc M Do
(74) *Attorney, Agent, or Firm* — TROUTMAN PEPPER LOCKE LLP

(57) ABSTRACT

A vehicle includes one or more processors. The one or more processors include a controller. The controller is configured to: perform an acceleration suppression control, in which the acceleration suppression control is configured to suppress acceleration of the vehicle based on pressing of an accelerator pedal of the vehicle performed by a driver who drives the vehicle; and cancel the acceleration suppression control, when two or more operation elements provided in the vehicle are operated by the driver.

11 Claims, 4 Drawing Sheets

VEHICLE

CROSS-REFERENCE TO RELATED APPLICATION

The present application claims priority from Japanese Patent Application No. 2022-078059 filed on May 11, 2022, the entire contents of which are hereby incorporated by reference.

BACKGROUND

The disclosure relates to a vehicle.

For example, Japanese Unexamined Patent Application Publication (JP-A) No. 2021-172245 proposes a vehicle that performs an acceleration suppression control that suppresses acceleration of the vehicle caused by an erroneous pressing of an accelerator pedal. This makes it possible to suppress the acceleration of the vehicle even when the erroneous pressing of the accelerator pedal has occurred.

SUMMARY

An aspect of the disclosure provides a vehicle including one or more processors. The one or more processors include a controller. The controller is configured to: perform an acceleration suppression control, in which the acceleration suppression control is configured to suppress acceleration of the vehicle based on pressing of an accelerator pedal of the vehicle performed by a driver who drives the vehicle; and cancel the acceleration suppression control, when two or more operation elements provided in the vehicle are operated by the driver.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
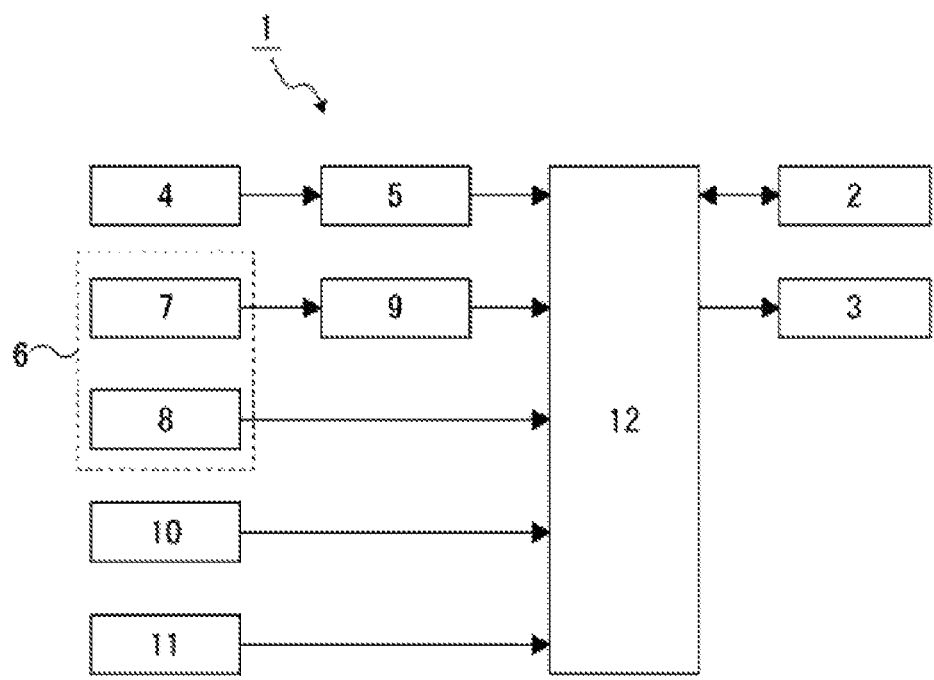
FIG. 1 is a diagram illustrating an outline of a configuration of a vehicle according to one example embodiment of the disclosure.

A vehicle, such as that disclosed in JP-A No. 2021-172245, has an issue in that it is difficult to accelerate the vehicle due to execution of an acceleration suppression control even when a driver who drives the vehicle has intentionally pressed an accelerator pedal to accelerate the vehicle, and that a convenience decreases accordingly.

It is desirable to provide a vehicle that makes it possible to improve a convenience.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 is a diagram illustrating a configuration of a vehicle 1 according to an example embodiment of the disclosure. Referring to FIG. 1, the vehicle 1 may include an engine 2, a transmission 3, an accelerator pedal 4, an accelerator pedal sensor 5, a steering wheel 6, a paddle shift lever 7, an operation button 8, a shift lever sensor 9, a speed sensor 10, an acceleration sensor 11, and a controller 12.

The engine 2 may be a drive source of the vehicle 1. The engine 2 may be, for example, a horizontally opposed engine in which a pair of cylinder groups are horizontally disposed in a left-right direction with a crankshaft being interposed therebetween. The engine 2 may reciprocate a piston by a combustion pressure based on burning of a mixture of gasoline and air in a cylinder. The engine 2 may obtain power by rotating the crankshaft coupled to the piston via a connecting rod.

The engine 2 may be a series engine, a V-engine, or an engine of any other type. The engine 2 may be a diesel engine. The engine 2 and a motor may be provided as drive sources. Alternatively, the motor may be provided instead of the engine 2.

The engine 2 may include sensors that detect a state of the engine 2, and output detection results of the sensors to the controller 12. Non-limiting examples of the sensors may include a rotation speed sensor and a water temperature sensor.

The transmission 3 may be coupled to the crankshaft of the engine 2, and perform shifting on the power from the crankshaft and transmit the power to drive wheels. The transmission 3 may be a stepped transmission or a continuously variable transmission.

The accelerator pedal 4 may receive a pressing operation performed by a driver who drives the vehicle 1. The accelerator pedal sensor 5 may detect an amount of pressing of the accelerator pedal 4, and output a signal indicating the detected amount of pressing to the controller 12.

The steering wheel 6 may receive a turning operation performed by the driver. The vehicle 1 may be steered based on a rotation angle of the steering wheel 6.

The paddle shift lever 7 and the operation button 8 may be attached to the steering wheel 6.

Figure 2:
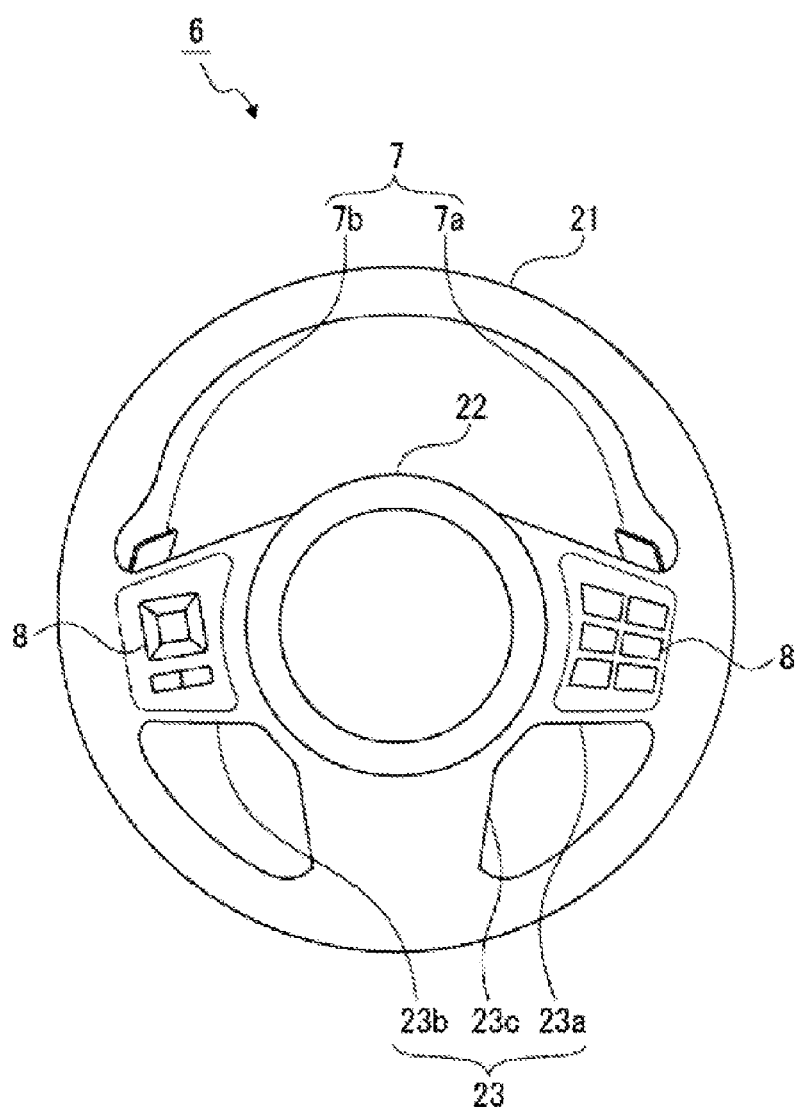
FIG. 2 is a diagram illustrating an example of a configuration of a steering wheel.

FIG. 2 is a diagram illustrating an example of a configuration of the steering wheel 6. Referring to FIG. 2, the steering wheel 6 may include a rim 21, a hub 22, and a spoke 23. The rim 21 may have an annular shape. The hub 22 may be disposed at the center of the rim 21. The spoke 23 may couple the rim 21 and the hub 22.

The spoke 23 may include a right spoke 23a, a left spoke 23b, and a lower spoke 23c. The right spoke 23a may extend in a right direction from the hub 22. The left spoke 23b may extend in a left direction from the hub 22. The lower spoke 23c may extend in a downward direction from the hub 22. The spoke 23 may have a substantially T-shape as a whole.

The right hand of the driver may come into contact with a connection part of the rim 21 where the right spoke 23a is coupled, and the left hand of the driver may come into contact with a connection part of the rim 21 where the left spoke 23b is coupled, to thereby operate the steering wheel 6 of the vehicle 1.

The right spoke 23a and the left spoke 23b each may have the operation button 8 that receives a pressing operation performed by the driver. For example, the operation button 8 of the right spoke 23a may be disposed at a position operable by the driver's right thumb, and the operation button 8 of the left spoke 23b may be disposed at a position operable by the driver's left thumb.

When operated by the driver, the operation button 8 may output a signal corresponding to the relevant operation button 8 to the controller 12.

The paddle shift lever 7 may be attached to a back side (i.e., a side spaced from the driver) of the spoke 23 of the hub 22. The paddle shift lever 7 may include a shift-up lever 7a directed to upshifting and a shift-down lever 7b directed to downshifting.

The shift-up lever 7a may be disposed on a back side of the right spoke 23a. The shift-down lever 7b may be disposed on a back side of the left spoke 23b.

When the steering wheel 6 is turned by the driver, the paddle shift lever 7 and the operation button 8 may be turned in response to the turning of the steering wheel 6.

Figure 3:
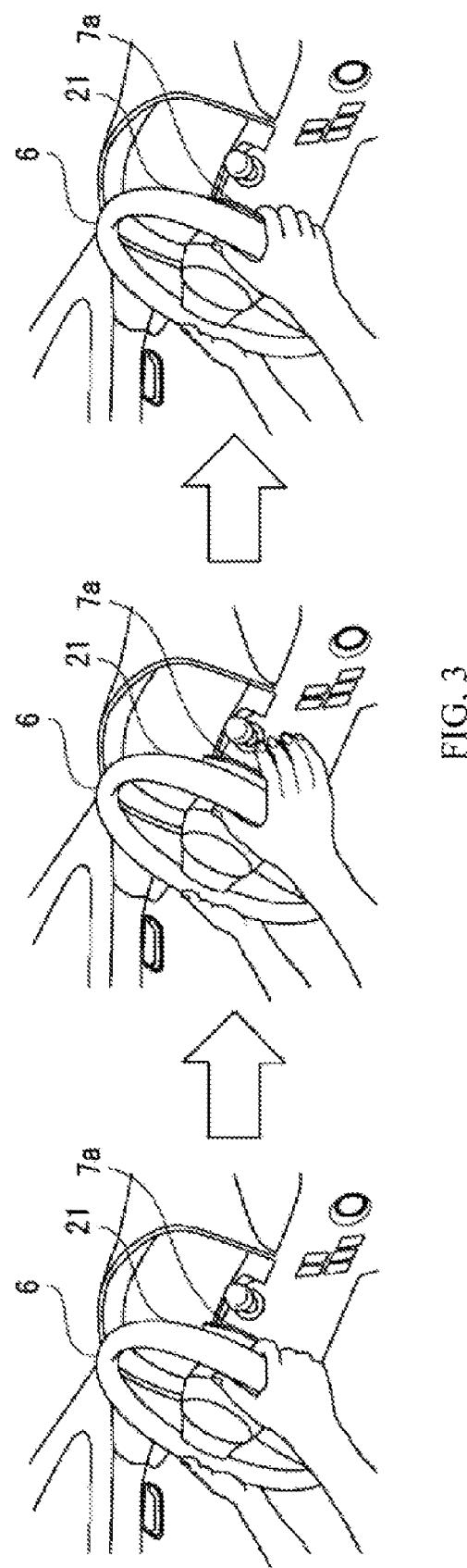
FIG. 3 is a diagram illustrating an example of a method of operating a paddle shift lever.

FIG. 3 is a diagram illustrating an example of a method of operating the paddle shift lever 7. It should be noted that a description is given here with reference to FIG. 3 of an example of a method of operating the shift-up lever 7a as the exemplary paddle shift lever 7. The description applies similarly to the shift-down lever 7b as well.

Referring to the left side of FIG. 3, the driver may grasp the rim 21 with the entire right hand and the entire left hand when the shift-up lever 7a is not operated. For example, the driver's thumbs may be in close contact with a front surface of the rim 21, and the driver's index fingers to the little fingers may be in close contact with a back surface of the rim 21.

When the driver tries to operate the shift-up lever 7a, the driver may extend the index finger to the little finger and release the index finger to the little finger from the back surface of the rim 21 as illustrated in the middle of FIG. 3. Thereafter, as illustrated in the right side of FIG. 3, the driver may make the forefinger to the little finger abut against the back surface of the shift-up lever 7a, and then move the shift-up lever 7a front by holding the forefinger to the little finger.

Accordingly, the paddle shift lever 7 is an operation element that is difficult to operate unless the driver intentionally or consciously moves his/her hand, and is not operated unconsciously even when the driver is rushed, for example.

On the other hand, the operation button 8 is an operation element that is operable almost without moving a finger when the driver brings his/her hand at a normal position at which the steering wheel 6 is held, and can possibly be operated unconsciously, for example, when the driver is rushed.

Returning to FIG. 1, the shift lever sensor 9 may detect that the paddle shift lever 7 is operated. The shift lever sensor 9 may output a signal based on a detection result, i.e., a signal indicating that the shift-up lever 7a or the shift-down lever 7b is operated, to the controller 12.

The speed sensor 10 may detect a speed of the vehicle 1, and output a signal indicating the speed of the vehicle 1 to the controller 12.

The acceleration sensor 11 may detect an acceleration rate of the vehicle 1, and output a signal indicating the acceleration rate of the vehicle 1 to the controller 12.

The controller 12 may be or may include a processor (or a computer) including CPU (Central Processing Unit), RAM (Random Access Memory), and ROM (Read Only Memory). In some embodiments, the controller 12 may be or may include one or more processors.

The controller 12 may control the vehicle 1 as a whole by reading a program stored in the ROM or an unillustrated storage into the RAM and executing the program. For example, the controller 12 may control the engine 2 and the transmission 3, based on signals received from the engine 2, the accelerator pedal sensor 5, the shift lever sensor 9, the speed sensor 10, and the acceleration sensor 11.

For example, the controller 12 may determine a target torque and a target engine speed of the engine 2 by referring to a map stored in advance, based on the signal indicating the pressing amount received from the accelerator pedal sensor 5 and the signal indicating the speed of the vehicle 1 received from the speed sensor 10. The controller 12 may so drive the engine 2 that the target torque and the target engine speed thus determined are achieved.

The controller 12 may determine a transmission ratio (a transmission step) of the transmission 3, based on the signal indicating the pressing amount received from the accelerator pedal sensor 5, the signal indicating the speed of the vehicle 1 received from the speed sensor 10, and an engine speed of the engine 2. The controller 12 may so control the transmission 3 that the transmission ratio (the transmission step) thus determined is achieved.

When a signal is received from the shift lever sensor 9, the controller 12 may determine the transmission ratio (the transmission step) based on the signal, and so shift-change the transmission 3 that the transmission ratio (the transmission step) thus determined is achieved.

For example, when a signal indicating that the shift-up lever 7a is operated is received, the controller 12 may raise the transmission step by one step, and lower the transmission step by one step when a signal indicating that the shift-down lever 7b is operated is received.

It should be noted that a method of controlling the engine 2 and the transmission 3 described above is exemplary, and any other method may be employed.

The vehicle 1 may be provided with a safe mode that limits acceleration of the vehicle 1. In one embodiment, the safe mode may serve as an "acceleration suppression control". For example, the safe mode may be executed when the engine 2 is started using a key associated with execution of the safe mode in advance.

The safe mode may be, for example, provided for an elderly driver. The safe mode may suppress the acceleration of the vehicle 1 that is not intended by the driver when the driver has erroneously pressed the accelerator pedal 4.

When the safe mode is in execution, the controller 12 may so control the engine 2 that the acceleration rate detected by the acceleration sensor 11 does not become equal to or greater than a preset upper limit value even when the accelerator pedal 4 is pressed. This allows the vehicle 1 to accelerate up to the acceleration rate less than the upper limit value.

However, when it is desired to increase the speed of the vehicle 1 at a relatively short distance (or within a relatively short period of time), for example, at the time of merging with a freeway, it is necessary to accelerate the vehicle 1 at the upper limit value or greater. On the other hand, if it is possible to cancel the safe mode easily in response to such a demand, the safe mode can possibly be cancelled even in a situation where it is desirable to actually limit the acceleration of the vehicle 1.

Accordingly, in the vehicle 1 according to the example embodiment, the controller 12 temporarily cancels the safe mode, or the acceleration suppression control, when two or more operation elements are operated by the driver.

In some embodiments, the controller 12 may temporarily cancel the safe mode, when, in a situation where the acceleration is necessary, the accelerator pedal 4 is operated first, following which the shift-up lever 7a and the shift-down lever 7b are operated substantially simultaneously while the accelerator pedal 4 is operated.

Figure 4:
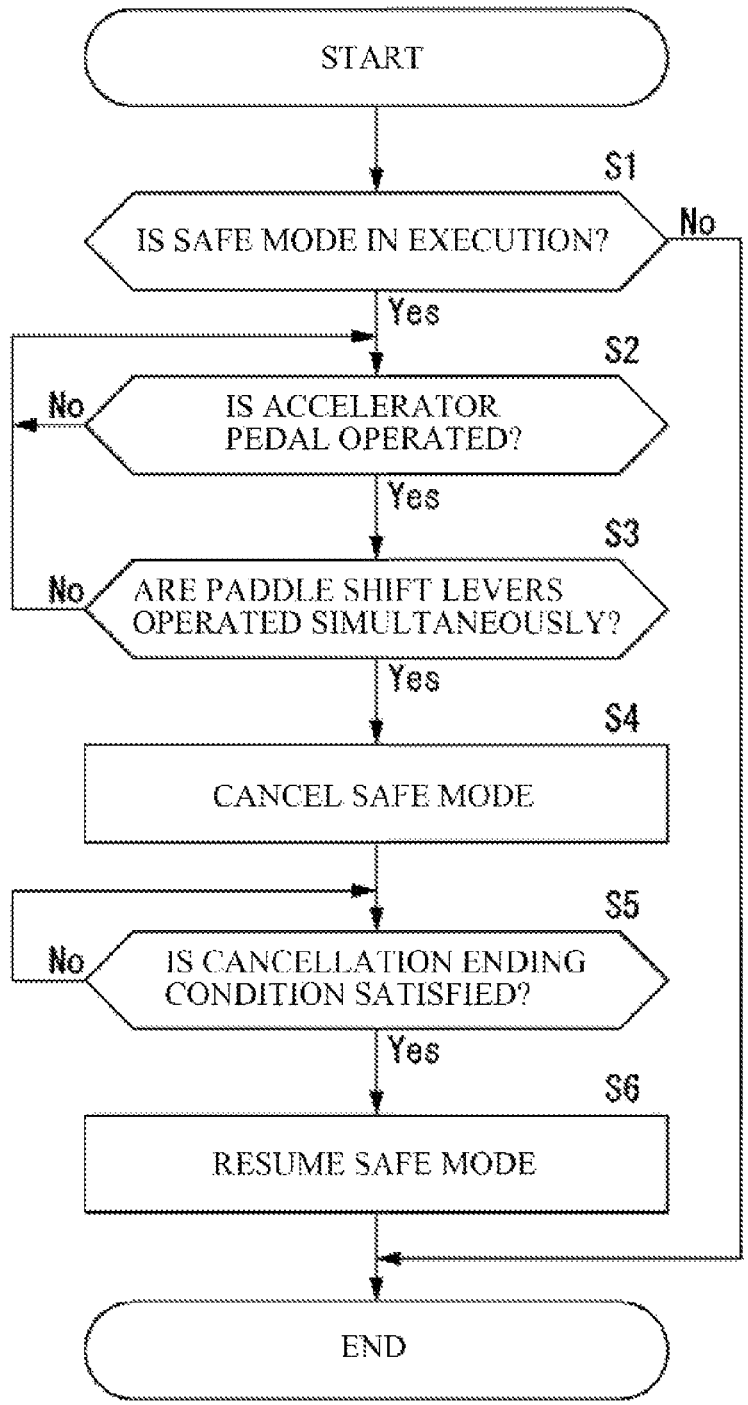
FIG. 4 is a flowchart illustrating an example of a flow of a process of cancellation a safe mode and ending the cancellation of the safe mode.

FIG. 4 is a flowchart illustrating an example of a flow of a process of cancelling the safe mode and ending the cancellation of the safe mode.

In step S1, the controller 12 may determine whether the safe mode is in execution. If the safe mode is not in execution (No in step S1), the controller 12 may end the process. If the safe mode is in execution (Yes in step S1), the controller 12 may determine whether the accelerator pedal 4 is operated in step S2. In some embodiments, in step S2, the controller 12 may determine that the accelerator pedal 4 is operated, when the signal indicating the amount of pressing of the accelerator pedal 4 received from the accelerator pedal sensor 5 has a value greater than 0 (zero).

If the accelerator pedal 4 is operated (Yes in step S2), the controller 12 may determine whether the shift-up lever 7a and the shift-down lever 7b are operated substantially simultaneously in step S3. In some embodiments, in step S3, the controller 12 may determine that the shift-up lever 7a and the shift-down lever 7b are operated substantially simultaneously, when the signal indicating that the shift-up lever 7a is operated and the signal indicating that the shift-down lever 7b is operated are received from the shift lever sensor 9 within a predetermined period of time, such as 200 milliseconds without limitation.

It should be noted that, when the shift-up lever 7a and the shift-down lever 7b are operated substantially simultaneously, a shift change with respect to the paddle shift lever 7 operated earlier is executed. However, an operation of the paddle shift lever 7 operated later executes a shift change opposite to the shift change based on the operation of the paddle shift lever 7 operated earlier, by which the transmission ratio of the transmission 3 returns to an original state. In other words, when the shift-up lever 7a and the shift-down lever 7b are operated substantially simultaneously, the transmission ratio (the transmission step) of the transmission 3 may remain unchanged.

However, because the shift-up lever 7a and the shift-down lever 7b can possibly be operated substantially simultaneously, in some embodiments, the controller 12 may prevent the shift change from being performed for a predetermined period of time after one of the paddle shift levers 7 is operated. In this case, the controller 12 may prevent the shift change from being performed, when the other paddle shift lever 7 is operated before the predetermined period of time elapses from the operation of one of the paddle shift levers 7. In some embodiments, when the predetermined period of time has elapsed from the operation of one of the paddle shift levers 7, the controller 12 may perform the shift change in response to the operation of the one of the paddle shift levers 7.

If the accelerator pedal 4 is not operated (No in step S2) or if the accelerator pedal 4 is operated but the shift-up lever 7a and the shift-down lever 7b are not operated substantially simultaneously (Yes in step S2 and No in step S3), the controller 12 may return the process to step S2.

If the shift-up lever 7a and the shift-down lever 7b are operated substantially simultaneously after the accelerator pedal 4 is operated (Yes in step S2 and Yes in step S3), the controller 12 may cancel the safe mode in step S4. For example, the controller 12 may so control the engine 2 as to perform the acceleration at the acceleration rate equal to or higher than the upper limit value.

Thereafter, in step S5, the controller 12 may determine whether a preset cancellation ending condition is satisfied.

The cancellation ending condition may be a condition for ending the cancellation of the safe mode.

For example, the cancellation ending condition may include setting in which any one of the accelerator pedal 4, the shift-up lever 7a, and the shift-down lever 7b is no longer operated. The cancellation ending condition may reflect the intention of the driver to end the safe mode.

In another example, the cancellation ending condition may include setting in which the acceleration rate of the vehicle 1 becomes equal to or less than the upper limit value of the safe mode. This condition may reflect circumstances in which the acceleration rate of the vehicle 1 becomes low and the cancellation of the safe mode is no longer necessary accordingly.

If the cancellation ending condition is not satisfied (No in step S5), the controller 12 may return the process to step S5 to continue the cancellation of the safe mode.

If the cancellation ending condition is satisfied (Yes in step S5), the controller 12 may end the cancellation of the safe mode and resume the safe mode in step S6.

Although some example embodiments according to the disclosure have been described above, embodiments of the disclosure are not limited to those described above, and various configurations can be adopted.

For example, in the above-described example embodiment, the safe mode may be cancelled when the shift-up lever 7a and the shift-down lever 7b are operated substantially simultaneously. However, the operation elements are not limited to the shift-up lever 7a and the shift-down lever 7b, as long as the safe mode is cancelled when two or more operation elements are operated by the driver.

In some embodiments, the safe mode may be cancelled when two or more operation buttons 8 are operated substantially simultaneously.

In some embodiments, the operation elements directed to the cancellation of the safe mode may be provided on the steering wheel 6. In this case, the operation elements may be turned in response to the turning of the steering wheel 6, thereby making it difficult for the driver to operate the operation elements when the turning operation of the steering wheel 6 is performed at a certain level or more. This configuration helps to prevent a behavior disturbance of the vehicle 1 caused by sudden turning and sudden acceleration of the vehicle 1.

Further, in the above-described example embodiment, the safe mode may be cancelled when the shift-up lever 7a and the shift-down lever 7b are operated substantially simultaneously after the accelerator pedal 4 is pressed first. In some embodiments, the safe mode may be cancelled when the shift-up lever 7a and the shift-down lever 7b are operated substantially simultaneously regardless of the operation of the accelerator pedal 4. However, the safe mode can be cancelled when the shift-up lever 7a and the shift-down lever 7*b* are operated substantially simultaneously after the accelerator pedal 4 is pressed first.

Further, the cancellation ending condition may include setting in which the speed of the vehicle 1 is equal to or higher than a predetermined speed. Thus, the vehicle 1 may end the cancellation of the safe mode when the vehicle 1 accelerates suddenly and reaches the set speed. This configuration helps to prevent the sudden acceleration from being continued without involving the ending of the cancellation of the safe mode, due to an abnormal operation performed by the driver or an on-fixture of the operation element including, without limitation, the shift-up lever 7*a* and the shift-down lever 7*b*. For example, a value such as a sign recognition value, a setting value of the driver, or a value indicated in map data may be set for the set speed.

The vehicle 1 according to the example embodiment includes one or more processors. The one or more processors include the controller 12 that performs the acceleration suppression control, or the safe mode. The acceleration suppression control suppresses the acceleration of the vehicle based on the pressing of the accelerator pedal 4. The controller 12 cancels the acceleration suppression control, when two or more operation elements, including, without limitation, the shift-up lever 7*a* and the shift-down lever 7*b*, are operated by the driver.

Thus, the controller 12 temporarily cancels the acceleration suppression control and performs rapid acceleration of the vehicle 1 when two or more operation elements are operated by the driver.

Accordingly, the vehicle 1 temporarily cancels the acceleration suppression control in accordance with a conscious operation performed by the driver to allow for the rapid acceleration of the vehicle 1 when the rapid acceleration such as at the time of the merging with the freeway is necessary, while suppressing the sudden acceleration due to the erroneous pressing of the accelerator pedal 4 by performing the acceleration suppression control under normal circumstances. Hence, the example embodiment makes it possible to improve a convenience of the vehicle 1.

In some embodiments, the controller 12 may cancel the acceleration suppression control, when two or more operation elements are operated by the driver after the accelerator pedal 4 is pressed.

Thus, even when the accelerator pedal 4 is pressed after two or more operation elements are operated by the driver, the controller 12 prevents the sudden acceleration from being performed on the premise that a possibility of an erroneous operation by the driver, such as re-pressing of the accelerator pedal 4, has occurred. Hence, it is possible to further improve the convenience of the vehicle 1.

In addition, when two or more operation elements have the on-fixture before the accelerator pedal 4 is pressed, the acceleration suppression control is prevented from being cancelled and the sudden acceleration is prevented from being performed accordingly. Hence, it is possible to secure the convenience.

Further, the on-fixture of two or more operation elements hardly occurs at a timing after the accelerator pedal 4 is pressed. Hence, it is possible to secure the convenience.

In some embodiments, the controller 12 may cancel the acceleration suppression control, when two or more operation elements that issue respective instructions that are against each other are operated by the driver.

Two or more operation elements that issue the mutually contrary instructions (e.g., upshift and downshift, etc.), including, without limitation, the shift-up lever 7*a* and the shift-down lever 7*b*, are not operated simultaneously unless the driver intends to operate them. Hence, the controller 12 makes it possible to prevent the sudden acceleration due to the erroneous operation.

In some embodiments, the operation elements may be provided on the steering wheel 6, and may be turned in response to the turning of the steering wheel 6.

Thus, this makes it difficult for the driver to simultaneously operate the shift-up lever 7*a* and the shift-down lever 7*b* when a large steering angle is applied to the steering wheel 6 while achieving the cancellation of the safe mode during a moderate turning of the vehicle 1. Hence, it is possible to prevent the behavior disturbance of the vehicle 1 due to the sudden turning and the sudden acceleration of the vehicle 1.

In some embodiments, the operation elements may include a paddle shift lever 7 that changes the shifting of the vehicle 1.

The shift-up lever 7*a* and the shift-down lever 7*b* are operable consciously (see FIG. 3), making it possible to cancel the acceleration suppression control by the conscious operation. Hence, it is possible to further improve the convenience of the vehicle 1.

According to at least one embodiment of the disclosure, it is possible to improve a convenience of a vehicle.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The controller 12 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 12. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 12 illustrated in FIG. 1.

The invention claimed is:

1. A vehicle comprising:
one or more processors, wherein
the one or more processors comprise a controller configured to:
perform an acceleration suppression control, the acceleration suppression control being configured to suppress acceleration of the vehicle based on pressing of an accelerator pedal of the vehicle performed by a driver who drives the vehicle;

cancel the acceleration suppression control when two or more operation elements provided in the vehicle are operated by the driver; and cancel the acceleration suppression control, when the two or more operation elements are operated substantially simultaneously by the driver while the accelerator pedal is pressed.

2. The vehicle according to claim 1, wherein the controller is configured to cancel the acceleration suppression control, when the two or more operation elements are operated by the driver after the accelerator pedal is pressed.

3. The vehicle according to claim 1, wherein the controller is configured to cancel the acceleration suppression control, when the two or more operation elements configured to issue respective instructions that are against each other are operated by the driver.

4. The vehicle according to claim 2, wherein the controller is configured to cancel the acceleration suppression control, when the two or more operation elements configured to issue respective instructions that are against each other are operated by the driver.

5. The vehicle according to claim 1, wherein the two or more operation elements are provided on a steering wheel of the vehicle, and are configured to be turned in response to turning of the steering wheel.

6. The vehicle according to claim 2, wherein the two or more operation elements are provided on a steering wheel of the vehicle, and are configured to be turned in response to turning of the steering wheel.

7. The vehicle according to claim 5, wherein the two or more operation elements comprise a paddle shift lever configured to change shifting of the vehicle.

8. The vehicle according to claim 6, wherein the two or more operation elements comprise a paddle shift lever configured to change shifting of the vehicle.

9. The vehicle according to claim 1, wherein, the controller is configured to determine whether a preset cancellation ending condition is satisfied, and in response to determining the preset cancellation ending condition is satisfied, terminate the cancellation of the acceleration suppression control to resume the acceleration suppression control, the preset cancellation ending condition is an acceleration rate of the vehicle being equal to or less than a predetermined upper limit value for the acceleration suppression control.

10. The vehicle according to claim 1, wherein, the controller is configured to determine whether a preset cancellation ending condition is satisfied, and in response to determining the preset cancellation ending condition is satisfied, terminate the cancellation of the acceleration suppression control to resume the acceleration suppression control, the two or more operation elements comprise a shift-up lever and a shift-down lever, and the preset cancellation ending condition is any one of the accelerator pedal, the shift-up lever, or the shift-down lever being no longer operated by the driver.

11. A vehicle comprising:

one or more processors, wherein the one or more processors comprise a controller configured to:

perform an acceleration suppression control, the acceleration suppression control being configured to suppress acceleration of the vehicle based on pressing of an accelerator pedal of the vehicle performed by a driver who drives the vehicle;

determine that a shift-up lever and a shift-down lever are operated substantially simultaneously by the driver, when detecting that the shift-down lever is operated by the driver within a predetermined time after detecting that the shift-up lever is operated by the driver; and cancel the acceleration suppression control, when determining that the shift-up lever and the shift-down lever are operated substantially simultaneously by the driver while the accelerator pedal is pressed.

* * * * *